Oct. 20, 1936.  D. FARR  2,057,941
APPARATUS FOR PRODUCING AN EDIBLE PRODUCT
Filed May 15, 1933  2 Sheets-Sheet 1
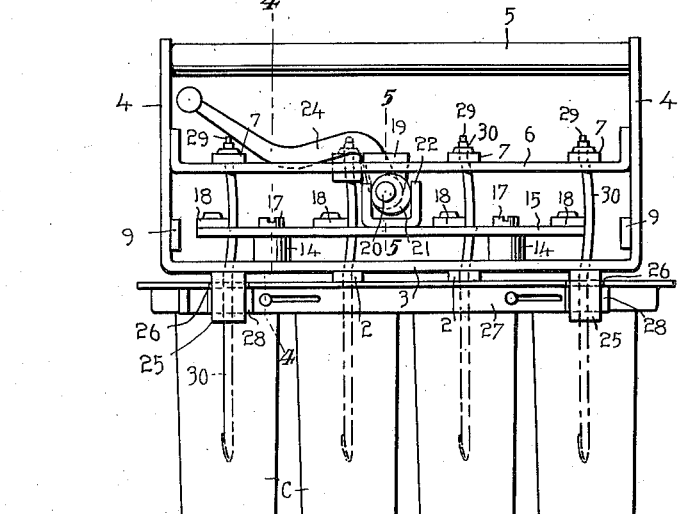
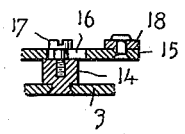
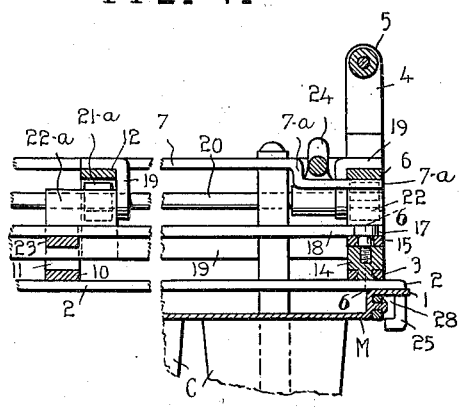
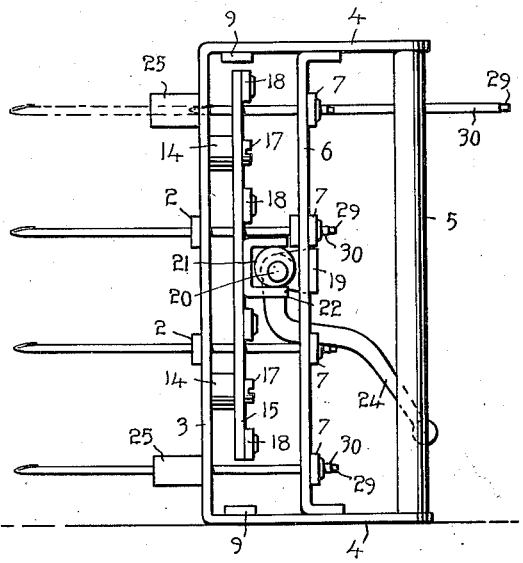
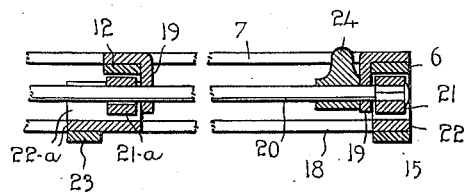
Inventor
Dexter Farr
By Ogle R. Singleton
Attorney Oct. 20, 1936.  D. FARR  2,057,941
APPARATUS FOR PRODUCING AN EDIBLE PRODUCT
Filed May 15, 1933  2 Sheets-Sheet 2
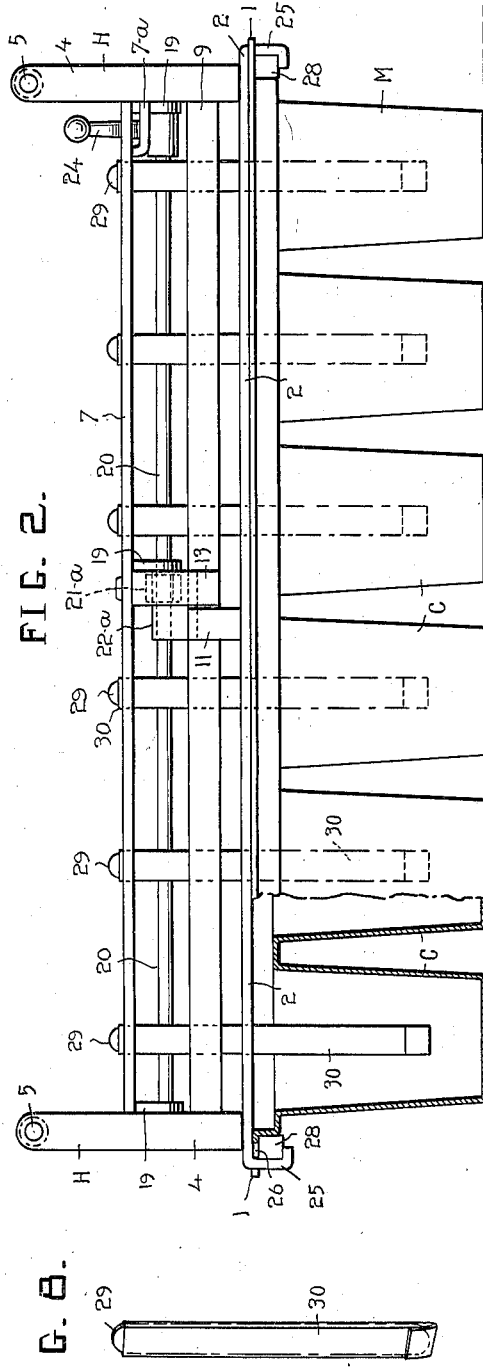
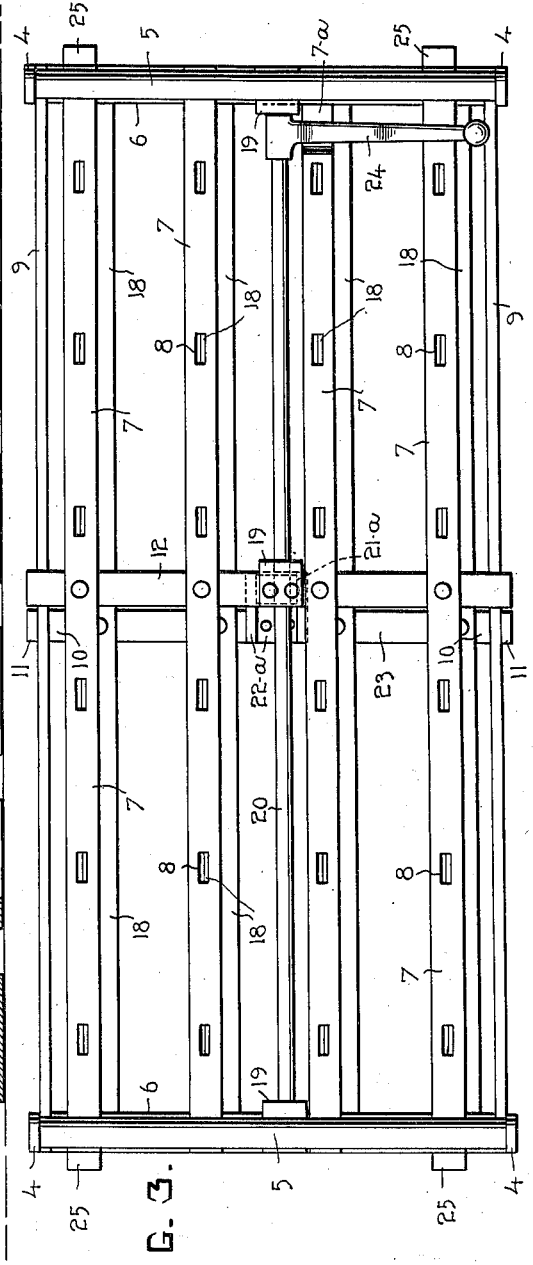

Patented Oct. 20, 1936

2,057,941

UNITED STATES PATENT OFFICE 2,057,941

APPARATUS FOR PRODUCING AN EDIBLE PRODUCT

Dexter Farr, Ogden, Utah

Application May 15, 1933, Serial No. 671,237

5 Claims. (Cl. 107—8)

My invention consists in a new and useful improvement in process of and apparatus for producing an edible product and is designed particularly for the purpose of manufacturing a frozen product provided with an envelope or casing embedded therein and containing a handle by which the product may be manipulated during its dispensing and consumption. I am aware that it is old to make an edible product, such as a block of ice cream, with a handle inserted therein, but I claim as the novel feature of my invention the provision of an envelope frozen in the product and a handle in such envelope which can be withdrawn therefrom as desired. By my improved process and the use of my improved apparatus, I can so produce the edible product that the envelope or casing with the handle therein inserted is frozen in the product in such a way that the handle can be withdrawn from the casing and can be re-inserted as may be desired. The particularly novel and useful feature of my improved apparatus by which my improved process may be practiced is the means which I provide for positioning the casing containing the handle in proper relation to the uncongealed mass of the product so that, when the mass is frozen, the casing will be enclosed in the mass, its open end protruding therefrom, and the handle in the casing will extend therefrom, and be freely removable therefrom. It must be especially noted that by my improved process the casing is fixed in the frozen mass but the handle within the casing remains unfixed and free to be removed. This important feature, viz., the removability of the handle is essential to the sales-promotion plan by which certain handles bear suitable indicia to indicate that the purchasers thereof are entitled to a prize. By this plan, the dealer dispenses the product, and the purchaser before consuming the product may remove the handle to examine it to ascertain whether the handle bears the indicia to entitle the purchaser to a prize, and can then return the handle to the ice cream block for use while consuming the block. It is also obvious that my improved process makes it possible for the handles to be removed to facilitate shipping the product.

While I have illustrated in the drawings filed herewith and have hereinafter fully described one specific embodiment of my invention of my improved apparatus, it is to be distinctly understood that I do not consider my invention limited to said specific embodiment, but refer for its scope to the claims appended hereto.

In the drawings:

Fig. 1 is an end elevation of my apparatus.

Fig. 2 is a side elevation of my apparatus.

Fig. 3 is a top plan view of the handle holder.

Fig. 4 is a fragmentary vertical section on the line 4—4 of Fig. 1.

Fig. 5 is a fragmentary vertical section on the line 5—5 of Fig. 1.

Fig. 6 is a vertical section on line 6—6 of Fig. 4.

Fig. 7 is an end elevation of the holder turned on its side, for the insertion of the casings and handles.

Fig. 8 is a perspective view of a casing and handle.

As illustrated in the drawings, my apparatus comprises the mould member M and the casing and handle holder H, the former being rectangular in shape with any desired number and arrangement of mould cups C (twenty-four, in four sets of six each, being illustrated). The member M is provided with the circumferential flange 1. The holder H has a series of four longitudinal plates 2, one for each set of cups C. These plates 2 are secured and properly spaced by transverse plates 3, one at each end of the holder H. These plates 3 have at their ends the upright arms 4 connected by the handles 5. Suitably disposed between the arms 4 and in vertical alignment with the plates 3 are the transverse plates 6 on which are carried the longitudinal plates 7 arranged in a series of four to correspond with the plates 2 and in vertical alignment therewith. The plates 2 and 7 are provided with aligned slots 8 so disposed that each pair of slots 8 is positioned over the center of one of the cups C. The arms 4 are provided with the longitudinal side bracing bars 9. Midway between the plates 3, there is the transverse bracing plate 10 attached above the longitudinal lower plates 2 and having the upstanding ears 11 on its ends attached to the plates 9. The transverse bracing plate 12 is disposed beneath and attached to the longitudinal upper plates 7 and has the depending ears 13 attached to the plates 9.

Suitably mounted upon the plates 3 are the blocks 14 on which are the transverse slides 15 having the slots 16 through which pass the headed pins 17 threaded into the blocks 14. Carried by the slides 15 are four longitudinal locking bars 18 corresponding with the four sets of pairs of slots 8, and so mounted that when the slides 15 are moved the bars 18 may be moved slightly within the lines of the slots 8.

Suitably mounted upon the plates 6 and the plate 12, are the depending bearings 19 in which is carried the reciprocable shaft 20 on which are carried the cam shoulders 21 in vertical alignment with the slides 15, with which co-act the forks 22 mounted on the slides 15. Midway between the slides 15 and in the same horizontal plane therewith, the brace plate 23 connects the locking bars 18, and has mounted thereon the fork 22—a with which co-acts the cam shoulder 21—a on the shaft 20. The shaft 20 is provided adjacent one of its bearings 19 with the operating crank handle 24. It is to be noted (Fig. 4) that the plate 7 adjacent the shaft 20 has its portion 7—a bent downwardly and connected on the under side of the plate 6 to obviate interference with the movement of the crank handle 24 to reciprocate the shaft 20.

Each of the plates 2, on the sides of the holder H, is provided at each of its ends with a depending hook 25. These hooks 25 pass through slots 26 in the flange 1 of the member M which is provided on each end with slides 27 carrying bolts 28 to co-act with the hooks 25 to latch the holder H to the member M.

From the foregoing description of the details of construction of my improved apparatus, its use and operation in the practice of my improved process will be obvious. The holder H is placed upon its side, as illustrated in Fig. 7, and is then charged with the casings 30 containing the handles 29, in the slots 8. When the operating crank handle 24 is moved from the position illustrated in Fig. 7 to its position illustrated in Fig. 1, its associated mechanism causes the locking bars 18 to press the casings 30 and handles 29 against the bars 2 and 7, thus fastening the casings 30 and handles 29 in properly adjusted position. The holder H is then applied to the mould member M, the cups C having been properly charged with the uncongealed mass to be frozen. Thus it is obvious that each casing 30 and its handle 29 is properly positioned in the mass in its cup C (Fig. 2). When the holder H has been locked upon the mould member M by means of the slides 27 and bolts 28, both the holder H and member M can be carried by the handles 5 to be placed in the freezing chamber. After the masses in the cups C have been properly frozen, and the apparatus has been removed from the freezing chamber, the slides 27 and bolts 28 are manipulated to release the holder H from the member M which has been sufficiently heated to free the frozen masses from the cups C, and when the holder H is raised by the handles 5, the masses are withdrawn from the cups C. When the crank handle 24 is manipulated to release the casings 30 and handles 29, and the holder H is raised, the frozen products pass out of the holder in completed form.

Having described my invention, what I claim is:

1. In apparatus for producing an edible product, in combination with a mould member, a removable frame therefor comprising a pair of U-shaped end plates, each provided with a handle, two sets of superposed slotted plates connecting said end plates, a shaft extending between said end plates, journaled thereon, and provided with a series of cams, a reciprocable plate mounted in each end plate and provided with a fork embracing one of said cams, and a series of bars connecting said reciprocable plates.

2. In apparatus for producing an edible product, the combination of a mould member; a frame adapted to be removably attached to said mould member; two series of plates on said frame, each having a plurality of slots, the slots of the two sets being in vertical alignment; two reciprocable plates mounted in said frame; a series of locking bars mounted on said reciprocable plates; a rocking shaft journaled over said reciprocable plates in said frame; cams on said shaft; and forks embracing said cams, and mounted on said reciprocable plates.

3. In apparatus for producing an edible product, in combination with a mould member, a frame therefor comprising end plates, two sets of superposed slotted plates connecting said end plates, a shaft extending between said end plates, journaled thereon, and provided with a cam, a reciprocable plate mounted in one end plate and provided with a fork embracing said cam, and a series of bars mounted upon said reciprocable plate.

4. In apparatus for producing an edible product, the combination of two sets of superposed, slotted, fixed members; a series of bars reciprocably mounted between said members; a rock shaft disposed between said members and having a cam thereon; and a fork fixed to said bars and embracing said cam.

5. In apparatus for producing an edible product, the combination of two sets of superposed, slotted, fixed members; reciprocable members mounted transversely of the fixed members; a series of bars connecting the reciprocable members and disposed parallel with the fixed members; a rock shaft disposed parallel with said fixed members and provided with a cam; and a fork mounted on one of said reciprocable members and embracing said cam.

DEXTER FARR.